US010121602B2

(12) United States Patent
Inoue et al.

(10) Patent No.: US 10,121,602 B2
(45) Date of Patent: Nov. 6, 2018

(54) METAL SUBSTRATE FOR DYE-SENSITIZED SOLAR CELL

(75) Inventors: Ryouji Inoue, Himeji (JP); Shinji Yamamoto, Kyoto (JP); Keita Watanabe, Osaka (JP); Masaaki Ishio, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 553 days.

(21) Appl. No.: 13/530,412

(22) Filed: Jun. 22, 2012

(65) Prior Publication Data

US 2013/0340820 A1    Dec. 26, 2013

(51) Int. Cl.
*H01L 31/0236* (2006.01)
*H01G 9/20* (2006.01)

(52) U.S. Cl.
CPC ............ *H01G 9/2068* (2013.01); *H01G 9/20* (2013.01); *H01G 9/2022* (2013.01); *H01G 9/2077* (2013.01); *H01G 9/2031* (2013.01); *H01G 9/2059* (2013.01); *Y02E 10/542* (2013.01)

(58) Field of Classification Search
CPC .. H01G 9/2068; H01G 9/2059; H01G 9/2031; Y02E 10/542; H01L 31/0392
See application file for complete search history.

(56) References Cited

U.S. PATENT DOCUMENTS 5,986,205 A * 11/1999 Matsune et al. ............. 136/258
7,446,923 B2 * 11/2008 Ishii et al. .................... 359/265

| 2002/0011264 | A1 * | 1/2002 | Saito ................. H01L 31/03685 136/258 |
| 2006/0102229 | A1 * | 5/2006 | Miyoshi ............... H01G 9/2022 136/263 |
| 2007/0107775 | A1 * | 5/2007 | Choi et al. .................... 136/263 |
| 2009/0293942 | A1 * | 12/2009 | Harimoto et al. ............ 136/252 |
| 2010/0108135 | A1 * | 5/2010 | Morooka .............. H01G 9/2022 136/256 |
| 2010/0276001 | A1 * | 11/2010 | Sawada ................... C22C 1/002 136/260 |
| 2011/0048525 | A1 * | 3/2011 | Yoneya et al. ................ 136/256 |
| 2011/0129731 | A1 | 6/2011 | Wakizaka et al. |
| 2011/0159362 | A1 | 6/2011 | Wakizaki et al. |

(Continued)

FOREIGN PATENT DOCUMENTS

JP        2007-311218 A    11/2007
JP        2008-53165 A      3/2008

(Continued)

OTHER PUBLICATIONS

Machine translation of JP 2008-153180; Aug. 22, 2014; pp. 1-21.*

(Continued)

*Primary Examiner* — Edward J. Schmiedel
(74) *Attorney, Agent, or Firm* — Westerman, Hattori, Daniels & Adrian, LLP

(57) ABSTRACT

This metal substrate for a dye-sensitized solar cell includes a clad material including a nonporous first metal layer, arranged on an anode side of a dye-sensitized solar cell element, made of a metal having corrosion resistance against an electrolyte of the dye-sensitized solar cell element and a second metal layer made of a metal having lower electrical resistance than the first metal layer and bonded to a side of the first metal layer opposite to the dye-sensitized solar cell element.

12 Claims, 7 Drawing Sheets

(56) References Cited

U.S. PATENT DOCUMENTS

| | | | |
|---|---|---|---|
| 2011/0180141 A1* | 7/2011 | Nishida | H01G 9/2022 136/256 |
| 2011/0186126 A1* | 8/2011 | Pex et al. | 136/256 |
| 2012/0090679 A1* | 4/2012 | Chittibabu et al. | 136/256 |
| 2015/0030922 A1 | 1/2015 | Kobayashi et al. | |

FOREIGN PATENT DOCUMENTS

| | | | |
|---|---|---|---|
| JP | 2008-104899 A | 5/2008 | |
| JP | 2008-153180 A | 7/2008 | |
| JP | 2010-021091 A | 1/2010 | |
| JP | 2010-055935 A | 3/2010 | |
| JP | 2010-080090 A | 4/2010 | |
| JP | WO 2010041732 A1 * | 4/2010 | H01G 9/2022 |
| WO | 2008093675 A1 | 8/2008 | |
| WO | 2010/008294 A1 | 1/2010 | |
| WO | 2010/032802 A1 | 3/2010 | |
| WO | 2010/037554 A2 | 4/2010 | |
| WO | 2010/107795 A1 | 9/2010 | |

OTHER PUBLICATIONS

Table of Electrical Resistivity and Conductivity; About.com; accessed Aug. 18, 2014; pp. 1-2; http://chemistry.about.com/od/moleculescompounds/a/Table-Of-Electrical-Resistivity-And-Conductivity.htm.*

Extended European Search Report dated Dec. 3, 2012, issued in corresponding European Patent Application No. 12173149.1 (7 pages).

Toivola M. et al, "Industrial sheet metals for nanocrystalline dye-sensitized solar cell structures", Solar Energy Materials and Solar Cells, Elsevier Science Publishers, vol. 90, No. 17, Nov. 6, 2006, pp. 2881-2893, XP028002340 (Cited in Extended European Search Report dated Dec. 3, 2012).

Jun et al., "A study of stainless steel-based dye-sensitized solar cells and modules", Solar Energy Materials and Solar Cells, Elsevier Science Publishers, vol. 91, No. 9, Apr. 13, 2007, pp. 779-784, XP022027694 (Cited in Extended European Search Report dated Dec. 3, 2012 ).

Japanese Office Action dated May 27, 2014, issued in Japanese Patent Application No. 2010-286863 with English translation (9 pages).

Office Action dated Sep. 1, 2016, issued in counterpart Chinese Patent Application No. 201210212219.9, with English translation. (25 pages).

Office Action dated Mar. 24, 2017, issued in Chinese Patent Application No. 201210212219.9, with English machine translation.

Communication pursuant to Article 94(3)EPC dated Oct. 20, 2017, issued in European Patent Application No. 12173149.1.

Office Action dated Jul. 24, 2017, issued in counterpart Korean Patent Application No. 10-2012-0066898, with English translation.

* cited by examiner

|  | RATIO OF THICKNESS OF Cu LAYER [%] | COMBINED VOLUME RESISTIVITY [$10^{-8} \Omega \times m$] (CALCULATED VALUE) | |
|---|---|---|---|
|  |  | Ryz(DIRECTION X) | Rxy(DIRECTION Z) |
| COMPARATIVE EXAMPLE 1 | 0 | 56.84 | 57.00 |
| EXAMPLE 1 | 10 | 13.39 | 51.47 |
| EXAMPLE 2 | 20 | 7.59 | 45.94 |
| EXAMPLE 3 | 30 | 5.30 | 40.41 |
| EXAMPLE 4 | 40 | 4.07 | 34.88 |
| EXAMPLE 5 | 50 | 3.30 | 29.35 |
| EXAMPLE 6 | 60 | 2.78 | 23.82 |
| EXAMPLE 7 | 70 | 2.40 | 18.29 |
| EXAMPLE 8 | 80 | 2.11 | 12.76 |
| EXAMPLE 9 | 90 | 1.88 | 7.23 |
| COMPARATIVE EXAMPLE 2 | 100 | 1.70 | 1.70 |

| | RATIO OF THICKNESS OF Cu LAYER[%] | COMBINED VOLUME RESISTIVITY [$10^{-8} \Omega \times m$](CALCULATED VALUE) | |
|---|---|---|---|
| | | Ryz(DIRECTION X) | Rxy(DIRECTION Z) |
| COMPARATIVE EXAMPLE 3 | 0 | 54.00 | 54.00 |
| EXAMPLE 10 | 10 | 13.25 | 48.77 |
| EXAMPLE 11 | 20 | 7.55 | 43.54 |
| EXAMPLE 12 | 30 | 5.28 | 38.31 |
| EXAMPLE 13 | 40 | 4.06 | 33.08 |
| EXAMPLE 14 | 50 | 3.30 | 27.85 |
| EXAMPLE 15 | 60 | 2.78 | 22.62 |
| EXAMPLE 16 | 70 | 2.40 | 17.39 |
| EXAMPLE 17 | 80 | 2.11 | 12.16 |
| EXAMPLE 18 | 90 | 1.88 | 6.93 |
| COMPARATIVE EXAMPLE 2 | 100 | 1.70 | 1.70 |

FIG.11

|  | THICKNESS OF Ti LAYER t3[μm] | THICKNESS OF Cu LAYER t2[μm] | THICKNESS OF STAINLESS LAYER t4[μm] | THICKNESS OF METAL SUBSTRATE t1[μm] | COMBINED VOLUME RESISTIVITY Ryz IN DIRECTION X[$10^{-8}$ Ω×m] (OBSERVED VALUE) |
|---|---|---|---|---|---|
| EXAMPLE 2a | 74 | 38 | 78 | 191 | 16.35 |
| EXAMPLE 4a | 57 | 76 | 56 | 188 | 4.78 |
| EXAMPLE 6a | 43 | 107 | 39 | 190 | 3.35 |

[REFERENCE1:COMBINED VOLUME RESISTIVITY Ryz OF EXAMPLE 2 Ryz=$7.59 \times 10^{-8}$ Ω·m]
[REFERENCE2:COMBINED VOLUME RESISTIVITY Ryz OF EXAMPLE 4 Ryz=$4.07 \times 10^{-8}$ Ω·m]
[REFERENCE3:COMBINED VOLUME RESISTIVITY Ryz OF EXAMPLE 6 Ryz=$2.78 \times 10^{-8}$ Ω·m]

FIG.12

|  | RATIO OF THICKNESS Cu LAYER[%] | RATIO OF THICKNESS OF Ti LAYER[%] | RATIO OF THICKNESS OF STAINLESS LAYER[%] | POWER GENERATION EFFICIENCY [%] |
|---|---|---|---|---|
| COMPARATIVE EXAMPLE 4 | 0 | 100 | 0 | 100 (REFERENCE) |
| EXAMPLE 2b | 20 | 40 | 40 | 110 |
| EXAMPLE 3b | 30 | 35 | 35 | 113 |
| EXAMPLE 4b | 40 | 30 | 30 | 114 |
| EXAMPLE 5b | 50 | 25 | 25 | 115 |
| EXAMPLE 6b | 60 | 20 | 20 | 115 |
| EXAMPLE 7b | 70 | 15 | 15 | 115 |

FIG.13

| | Ra (μm) | Rzjis (μm) | SURFACE AREA/ AREA | POWER GENERATION EFFICIENCY |
|---|---|---|---|---|
| EXAMPLE 4b | 0.06 | 0.35 | 1.01 | 100% (REFERENCE) |
| EXAMPLE 4c | 0.09 | 0.46 | 1.02 | △ |
| EXAMPLE 4d | 0.22 | 1.20 | 1.05 | ○ |

METAL SUBSTRATE FOR DYE-SENSITIZED SOLAR CELL

BACKGROUND OF THE INVENTION

Field of the Invention

The present invention relates to a metal substrate for a dye-sensitized solar cell, and more particularly, it relates to a metal substrate for a dye-sensitized solar cell including a metal layer having corrosion resistance against an electrolyte of a dye-sensitized solar cell element.

Description of the Background Art

A metal substrate for a dye-sensitized solar cell including a metal layer having corrosion resistance against an electrolyte of a dye-sensitized solar cell element is known in general, as disclosed in Japanese Patent Laying-Open No. 2010-55935, for example.

Japanese Patent Laying-Open No. 2010-55935 discloses a dye-sensitized solar cell including a glass substrate, arranged on a light incidence side, having a striped platinum electrode formed on a surface opposite to the light incidence side, a titanium substrate (metal substrate for a dye-sensitized solar cell), made of Ti, arranged on a side opposite to the light incidence side, a titania film arranged on the surface of the titanium substrate and an iodine electrolyte charged into a space between the titania film and the platinum electrode in a state where the titania film and the platinum electrode are arranged to be opposed to each other. A sensitizing pigment absorbing light is adsorbed to the titania film. Japanese Patent Laying-Open No. 2010-55935 discloses a point that a metal substrate made of a titanium alloy or stainless can be employed in place of the titanium substrate made of Ti. The metal substrate made of Ti, a Ti alloy or stainless has corrosion resistance against an electrolyte of a dye-sensitized solar cell element.

However, while the dye-sensitized solar cell disclosed in Japanese Patent Laying-Open No. 2010-55935 can keep corrosion resistance against the electrolyte of the dye-sensitized solar cell element due to the metal substrate made of Ti, a Ti alloy or stainless, electrical loss is disadvantageously easily caused in the metal substrate due to relatively high electrical resistance of Ti, a Ti alloy or stainless constituting the metal substrate. Therefore, power generation efficiency of the dye-sensitized solar cell is disadvantageously reduced.

SUMMARY OF THE INVENTION

The present invention has been proposed in order to solve the aforementioned problem, and an object of the present invention is to provide a metal substrate for a dye-sensitized solar cell capable of improving power generation efficiency of the dye-sensitized solar cell while keeping corrosion resistance against an electrolyte of a dye-sensitized solar cell element.

A metal substrate for a dye-sensitized solar cell according to an aspect of the present invention includes a clad material including a nonporous first metal layer, arranged on an anode side of a dye-sensitized solar cell element, made of a metal having corrosion resistance against an electrolyte of the dye-sensitized solar cell element and a second metal layer made of a metal having lower electrical resistance than the first metal layer and bonded to a side of the first metal layer opposite to the dye-sensitized solar cell element.

As hereinabove described, the metal substrate for a dye-sensitized solar cell according to the aspect of the present invention includes the clad material including the nonporous first metal layer and the second metal layer made of the metal having lower electrical resistance than the first metal layer and bonded to the first metal layer so that the metal substrate for a dye-sensitized solar cell is partially formed by the second metal layer having lower electrical resistance than the first metal layer dissimilarly to a case where the metal substrate for a dye-sensitized solar cell is formed by only the first metal layer, whereby electrical resistance of the metal substrate for a dye-sensitized solar cell can be reduced below that of a metal substrate for a dye-sensitized solar cell formed by only a first metal layer. Thus, electrical loss in the metal substrate for a dye-sensitized solar cell can be inhibited from increase. Consequently, power generation efficiency of the dye-sensitized solar cell can be improved as compared with the case where the metal substrate for a dye-sensitized solar cell is formed by only the first metal layer.

In the metal substrate for a dye-sensitized solar cell according to the aspect of the present invention, as hereinabove described, the first metal layer is made of the metal having corrosion resistance against the electrolyte of the dye-sensitized solar cell element and the second metal layer is bonded to the side of the first metal layer opposite to the dye-sensitized solar cell element, whereby the metal substrate for a dye-sensitized solar cell can keep corrosion resistance against the electrolyte of the dye-sensitized solar cell element also when the same is provided with the second metal layer. Consequently, the power generation efficiency of the dye-sensitized solar cell can be improved while keeping the corrosion resistance against the electrolyte of the dye-sensitized solar cell element.

In the metal substrate for a dye-sensitized solar cell according to the aforementioned aspect, the first metal layer and the second metal layer preferably constitute an anode of the dye-sensitized solar cell element. In the metal substrate for a dye-sensitized solar cell having the first and second metal layers thus constituting the anode of the dye-sensitized solar cell element, the second metal layer is made of the metal having lower electrical resistance than the first metal layer, whereby the electrical resistance of the metal substrate for a dye-sensitized solar cell can be reduced below that of a metal substrate for a dye-sensitized solar cell formed by only a first metal layer. Thus, the power generation efficiency of the dye-sensitized solar cell can be improved.

In the metal substrate for a dye-sensitized solar cell according to the aforementioned aspect, the first metal layer is preferably made of Ti or a Ti alloy, and the second metal layer is preferably made of any one of Cu, a Cu alloy, Al and an Al alloy. According to this structure, the metal substrate for a dye-sensitized solar cell is partially formed by the second metal layer made of any one of Cu, a Cu alloy, Al and an Al alloy having low electrical resistance dissimilarly to the case where the metal substrate for a dye-sensitized solar cell is formed by only the first metal layer, whereby the electrical resistance of the metal substrate for a dye-sensitized solar cell can be easily reduced below that of a metal substrate for a dye-sensitized solar cell formed by only a first metal layer.

In this case, the first metal layer is preferably made of Ti, the second metal layer is preferably made of Cu, and the thickness of the second metal layer is preferably at least 20% of a total thickness at least including the thickness of the first metal layer and the thickness of the second metal layer. According to this structure, a region occupied by the second metal layer made of Cu having low electrical resistance can be enlarged, whereby the electrical resistance of the overall metal substrate for a dye-sensitized solar cell can be more reduced.

In the aforementioned metal substrate for a dye-sensitized solar cell including the second metal layer whose thickness is at least 20% of the total thickness, the thickness of the second metal layer is preferably at least 50% of the total thickness at least including the thickness of the first metal layer and the thickness of the second metal layer. According to this structure, the region occupied by the second metal layer made of Cu having low electrical resistance can be more enlarged, whereby the electrical resistance of the overall metal substrate for a dye-sensitized solar cell can be further reduced.

In the metal substrate for a dye-sensitized solar cell according to the aforementioned aspect, the first metal layer is preferably made of Ti, and the thickness of the first metal layer is preferably at least 15% of a total thickness at least including the thickness of the first metal layer and the thickness of the second metal layer. According to this structure, the thickness of the first metal layer can be inhibited from excess reduction, whereby the first metal layer can be prevented from a defect such as breakage resulting from an excessively small thickness of the first metal layer.

The metal substrate for a dye-sensitized solar cell according to the aforementioned aspect preferably further includes a third metal layer bonded to a side opposite to the first metal layer in contact with the second metal layer, and the difference between the thermal expansion coefficient of the third metal layer and the thermal expansion coefficient of the first metal layer is preferably smaller than the difference between the thermal expansion coefficient of the second metal layer and the thermal expansion coefficient of the first metal layer. According to this structure, the third metal layer having the thermal expansion coefficient close to that of the first metal layer can inhibit the overall metal substrate for a dye-sensitized solar cell from deformation resulting from deformation of the second metal layer with respect to the first metal layer when the metal substrate for a dye-sensitized solar cell is thermally deformed.

In this case, the third metal layer is preferably made of a metal having higher corrosion resistance than the metal constituting the second metal layer. According to this structure, the third metal layer can inhibit the second metal layer from corrosion resulting from the external environment or the like.

In the aforementioned metal substrate for a dye-sensitized solar cell further including the third metal layer, the thickness of the first metal layer and the thickness of the third metal layer are preferably substantially identical to each other. According to this structure, the third metal layer having the thermal expansion coefficient close to that of the first metal layer as well as the thickness identical to that of the first metal layer can further inhibit the overall metal substrate for a dye-sensitized solar cell from deformation.

In the aforementioned metal substrate for a dye-sensitized solar cell further including the third metal layer, the first metal layer is preferably made of Ti or a Ti alloy, the second metal layer is preferably made of any one of Cu, a Cu alloy, Al and an Al alloy, and the third metal layer is preferably made of any one of Fe, ferritic stainless steel, Ti and a Ti alloy. According to this structure, the metal substrate for a dye-sensitized solar cell is partially formed by the second metal layer made of any one of Cu, a Cu alloy, Al and an Al alloy having low electrical resistance, whereby the electrical resistance of the metal substrate for a dye-sensitized solar cell can be reduced below that of a metal substrate for a dye-sensitized solar cell formed by only a first metal layer. Further, the third metal layer made of any one of Fe, ferritic stainless steel, Ti and a Ti alloy having a thermal expansion coefficient close to that of the first metal layer made of Ti or a alloy can inhibit the overall metal substrate for a dye-sensitized solar cell from deformation resulting from deformation of the second metal layer, made of any one of Cu, a Cu alloy, Al and an Al alloy, with respect to the first metal layer when the metal substrate for a dye-sensitized solar cell is thermally deformed.

In the aforementioned metal substrate for a dye-sensitized solar cell further including the third metal layer, the first metal layer is preferably made of Ti, the second metal layer is preferably made of Cu, and the thickness of the second metal layer is preferably at least 20% and not more than 70% of a total thickness at least including the thickness of the first metal layer, the thickness of the second metal layer and the thickness of the third metal layer. According to this structure, the region occupied by the second metal layer made of Cu having low electrical resistance can be enlarged to some extent, whereby the electrical resistance of the metal substrate for a dye-sensitized solar cell can be more reduced. Further, the region occupied by the second metal layer can be inhibited from excess enlargement, whereby the first metal layer can be prevented from a defect such as breakage resulting from an excessively small region occupied by the first metal layer.

In this case, the clad material is preferably constituted of the clad material prepared by bonding the first metal layer made of Ti, the second metal layer made of Cu and the third metal layer made of ferritic stainless steel to each other, and the thickness of the second metal layer is preferably at least 20% and not more than 70% of the total thickness consisting of the thickness of the first metal layer, the thickness of the second metal layer and the thickness of the third metal layer. When the metal substrate for a dye-sensitized solar cell is thus constituted of the clad material consisting of only three layers, the region occupied by the second metal layer made of Cu having low electrical resistance can be more enlarged as compared with a clad material formed by at least four layers including a second metal layer whose thickness is at least 20% and not more than 70%, whereby the electrical resistance of the metal substrate for a dye-sensitized solar cell can be more reduced. Further, the region occupied by the second metal layer can be inhibited from excess enlargement, whereby the first metal layer can be prevented from a defect such as breakage resulting from an excessively small region occupied by the first metal layer.

In the aforementioned metal substrate having the clad material prepared by bonding the first, second and third metal layers to each other, the third metal layer is preferably made of SUS430. According to this structure, the third metal layer made of SUS430 having a thermal expansion coefficient close to that of Ti can inhibit the overall metal substrate for a dye-sensitized solar cell from deformation resulting from deformation of the second metal layer, made of Cu, with respect to the first metal layer.

In the aforementioned metal substrate for a dye-sensitized solar cell including the second metal layer whose thickness is at least 20% and not more than 70% of the total thickness, the thickness of the second metal layer is preferably at least 30% and not more than 60% of the total thickness at least including the thickness of the first metal layer, the thickness of the second metal layer and the thickness of the third metal layer. According to this structure, the region occupied by the second metal layer made of Cu having low electrical resistance can be more enlarged, whereby the electrical resistance of the overall metal substrate for a dye-sensitized solar cell can be further reduced.

In the metal substrate for a dye-sensitized solar cell according to the aforementioned aspect, the electrical resistance of the second metal layer is preferably not more than 1/20 of the electrical resistance of the first metal layer. According to this structure, the electrical resistance of the metal substrate for a dye-sensitized solar cell including the first and second metal layers can be effectively reduced, whereby electrical loss in the metal substrate for a dye-sensitized solar cell can be effectively inhibited from increase.

In the metal substrate for a dye-sensitized solar cell according to the aforementioned aspect, a catalyst layer is preferably formed on a substrate surface of the first metal layer closer to the dye-sensitized solar cell element, and irregularities are preferably formed on the substrate surface of the first metal layer closer to the dye-sensitized solar cell element. According to this structure, the surface area of the substrate surface covered with the catalyst layer can be increased due to the irregularities of the substrate surface, whereby the surface area of the catalyst layer can be increased. Consequently, electrons can be more easily transferred through the catalyst layer, whereby the power generation efficiency of the dye-sensitized solar cell can be more improved.

In this case, a surface area/plane area ratio on the substrate surface of the first metal layer closer to the dye-sensitized solar cell element is preferably at least 1.03. According to this structure, the surface area of the substrate surface covered with the catalyst layer can be reliably increased due to the irregularities of the substrate surface, whereby the surface area of the catalyst layer can be reliably increased.

In the aforementioned metal substrate for a dye-sensitized solar cell having the surface area/plane area ratio of at least 1.03, the surface area/plane area ratio on the substrate surface of the first metal layer closer to the dye-sensitized solar cell element is preferably at least 1.05. According to this structure, the surface area of the substrate surface covered with the catalyst layer can be effectively increased due to the irregularities of the substrate surface, whereby the surface area of the catalyst layer can be effectively increased. The term "plane area" denotes the area of a plane on which a prescribed range where the surface area is measured is projected.

In the aforementioned metal substrate for a dye-sensitized solar cell having the irregularities formed on the substrate surface, arithmetic mean roughness Ra is preferably at least 0.10 μm, and ten point height of irregularities Rzjis is preferably at least 0.50 μm on the substrate surface of the first metal layer closer to the dye-sensitized solar cell element. According to this structure, the surface area of the substrate surface covered with the catalyst layer can be reliably increased due to the irregularities of the substrate surface, whereby the surface area of the catalyst layer can be reliably increased.

In the aforementioned metal substrate for a dye-sensitized solar cell having the arithmetic mean roughness Ra of at least 0.10 μm and the ten point height of irregularities Rzjis of at least 0.50 μm, the arithmetic mean roughness Ra is preferably at least 0.22 μm, and the ten point height of irregularities Rzjis is preferably at least 1.20 μm on the substrate surface of the first metal layer closer to the dye-sensitized solar cell element. According to this structure, the surface area of the substrate surface covered with the catalyst layer can be reliably increased due to the irregularities of the substrate surface, whereby the surface area of the catalyst layer can be reliably increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 illustrates experimental results of volume resistivity in a direction along upper surfaces of metal substrates having three-layer structures in measurement conducted in order to confirm effects of the present invention;

FIG. 12 illustrates experimental results of power generation efficiency of dye-sensitized solar cells in measurement conducted in order to confirm effects of the present invention; and FIG. 13 illustrates experimental results of power generation efficiency of dye-sensitized solar cells varied in surface roughness in measurement conducted in order to confirm effects of the present invention.

DESCRIPTION OF THE PREFERRED EMBODIMENTS

Embodiments of the present invention are now described with reference to the drawings.

First Embodiment

First, the structure of a dye-sensitized solar cell 100 according to a first embodiment of the present invention is described with reference to FIGS. 1 to 4.

Figure 1:
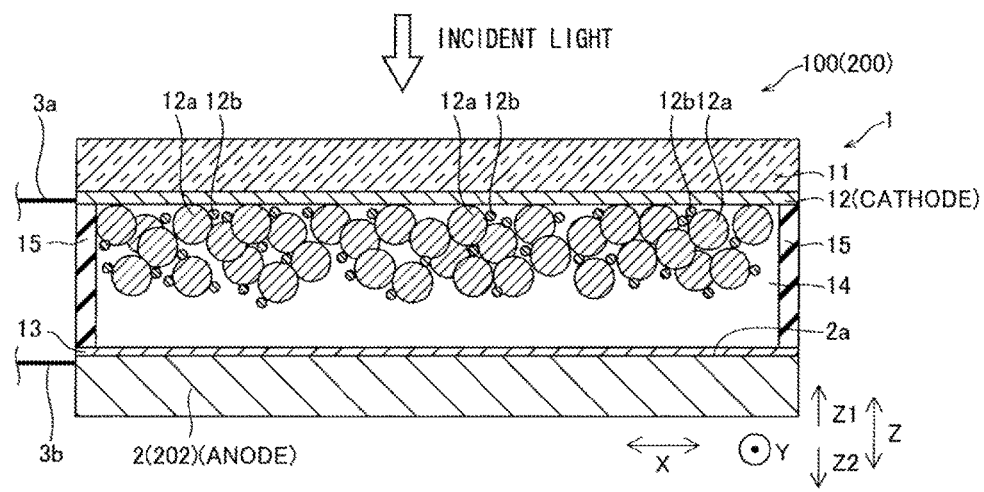
FIG. 1 is a sectional view showing the structure of a dye-sensitized solar cell according to a first embodiment of the present invention.

The dye-sensitized solar cell 100 according to the first embodiment of the present invention includes a solar cell element 1 arranged on alight-incidence side (along arrow Z1) and a metal substrate 2 arranged on a side (along arrow Z2) opposite to the light-incidence side, as shown in FIG. 1. The solar cell element 1 is an example of the "dye-sensitized solar cell element" in the present invention, and the metal substrate 2 is an example of the "clad material" or the "metal substrate for a dye-sensitized solar cell" in the present invention.

The solar cell element 1 includes a glass substrate 11, arranged on the light-incidence side, transmitting light, an upper electrode 12 formed on the lower surface (along arrow Z2) of the glass substrate 11, and a platinum catalyst layer 13, formed by a thin platinum film, provided on the upper surface of the metal substrate 2. The platinum catalyst layer 13 may be replaced with a catalyst layer made of graphite. The platinum catalyst layer 13 is an example of the "catalyst layer" in the present invention.

The solar cell element 1 further includes an iodine electrolyte 14 charged into a space between the upper electrode 12 and the platinum catalyst layer 13 and a sealing material 15 arranged to connect an end portion of the lower surface of the upper electrode 12 and an end portion of the upper surface of the platinum catalyst layer 13 with each other for sealing the iodine electrolyte 14 between the glass substrate 11 and the metal substrate 2. The iodine electrolyte 14 contains iodide ions ($I_3^-$) and iodine ions ($I^-$). The iodine electrolyte 14 is an example of the "electrolyte" in the present invention.

The upper electrode 12 is made of FTO (fluorine-doped tin oxide), having corrosion resistance against the iodine electrolyte 14, capable of transmitting light. The volume resistivity of FTO is about $800\times10^{-6}\Omega\times m$. The upper electrode 12 and the metal substrate 2 are formed to function as a cathode and an anode of the solar cell element 1 respectively.

Terminals 3a and 3b for extracting power generated in the dye-sensitized solar cell 100 are connected to the upper electrode 12 and the metal substrate 2 respectively. In order to feed current between a prescribed region of the metal substrate 2 and the terminal 3b, therefore, the current must flow in a direction along an X-Y plane (direction obtained by combining a direction X, a direction Y and components in the directions X and Y with each other).

Particulate titanium dioxides 12a are innumerably fixed to the lower surface side of the upper electrode 12. Light-absorbing portions 12b are adsorbed to the surfaces of the titanium dioxides 12a. The light-absorbing portions 12b are made of a pigment such as a ruthenium complex, and have functions of absorbing light consisting of visible light or the like and emitting electrons. The titanium dioxides 12a have functions of transmitting the electrons emitted from the light-absorbing portions 12b to the upper electrode 12.

The solar cell element 1 is a dye-sensitized solar cell element. A specific power generation mechanism of the solar cell element 1 is now described. When light is applied to the solar cell element 1, the light-absorbing portions 12b absorb the light, thereby emitting electrons and entering oxidation states. The electrons emitted from the light-absorbing portions 12b reach the upper electrode 12 (cathode) through the titanium dioxides 12a. Thereafter the electrons pass through an external circuit (not shown) from the upper electrode 12 through the terminal 3a. Then, the electrons reach the metal substrate 2 (anode) through the terminal 3b. The iodide ions ($I_3^-$) in the iodine electrolyte 14 receive the electrons through platinum, serving as a catalyst, of the platinum catalyst layer 13, to form triple iodine ions ($3I^-$). Then, the iodine ions ($I^-$) so supply electrons to the light-absorbing portions 12b in the oxidation states that the light-absorbing portions 12b return to the original states and the triple iodine ions ($3I^-$) revert to the iodide ions ($I_3^-$). The solar cell element 1 is formed to generate power by repeating the series of cycles.

Figure 2:
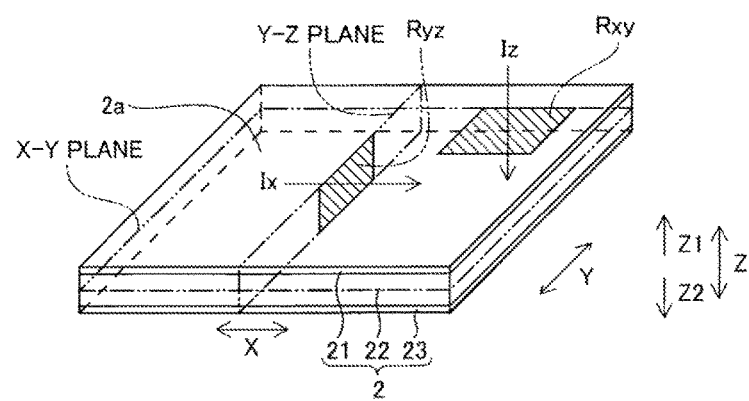
FIG. 2 is a perspective view schematically showing the structure of a metal substrate according to the first embodiment of the present invention.
Figure 3:
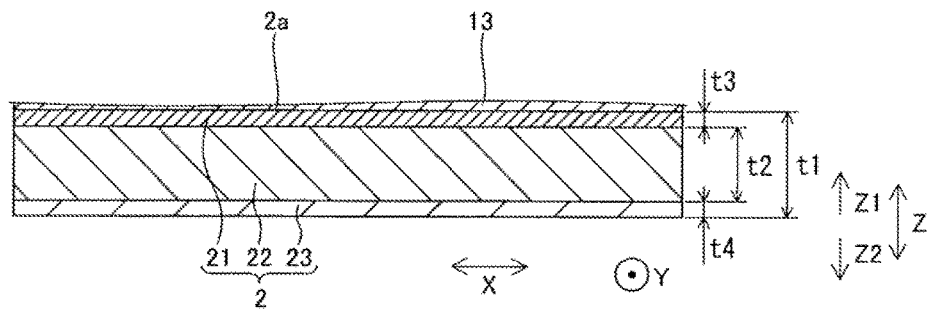
FIG. 3 is a sectional view showing the structure of the metal substrate according to the first embodiment of the present invention.

The metal substrate 2 is formed by arranging a Ti layer 21, a Cu layer 22 and a stainless layer 23 successively from the upper side (along arrow Z1) closer to the platinum catalyst layer 13 of the solar cell element 1, as shown in FIGS. 2 and 3. In other words, the Ti layer 21 is arranged in a state in contact with the lower surface of the platinum catalyst layer 13. The Ti layer 21 is an example of the "first metal layer" in the present invention, the Cu layer 22 is an example of the "second metal layer" in the present invention, and the stainless layer 23 is an example of the "third metal layer" in the present invention.

The metal substrate 2 is constituted of a clad material having a three-layer structure prepared by bonding the Ti layer 21, the Cu layer 22 and the stainless layer 23, provided in the form of flat plates respectively, in a state stacked in the thickness direction (direction Z) to each other.

Figure 4:
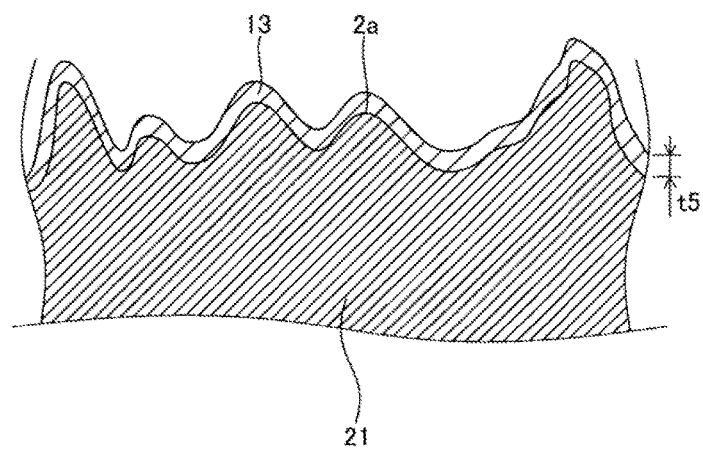
FIG. 4 is an enlarged sectional view showing the structure of the metal substrate according to the first embodiment of the present invention.

The Ti layer 21 is made of nonporous Ti, and has corrosion resistance against the iodine electrolyte 14. Further, irregularities are formed on an upper surface 2a (along arrow Z1) of the Ti layer 21 closer to the platinum catalyst layer 13 by roughening the upper surface 2a, as shown in FIG. 4. The upper surface 2a is an example of the "substrate surface" in the present invention.

More specifically, the Ti layer 21 is so formed that the upper surface 2a closer to the platinum catalyst layer 13 has arithmetic mean roughness Ra of about 0.22 μm, ten point height of irregularities Rzjis of about 1.20 μm and a surface area/plane area ratio of about 1.05. The surface area/plane area ratio denotes a value obtained by dividing the surface area of the upper surface 2a in an arbitrary square region by the plane area of the square region. The arithmetic mean roughness Ra, the ten point height of irregularities Rzjis and the surface area/plane area ratio on the upper surface 2a may simply be at least about 0.10 μm, at least about 0.50 μm and at least about 1.03 respectively.

The platinum catalyst layer 13 is formed to cover the upper surface 2a having the irregularities. Consequently, the surface area of the platinum catalyst layer 13 is larger than that in a case where no irregularities are formed on the upper surface 2a. If the platinum catalyst layer 13 is powdery, it is conceivable that the platinum is not provided in the form of a thin film (in a layered manner) but adheres to part of the upper surface 2a. Also in this case, the platinum easily adheres to the roughened upper surface 2a, to be increased in surface area.

The Cu layer 22 is made of Cu. The stainless layer 23 is made of SUS430 (JIS) having higher corrosion resistance than Cu. More specifically, the stainless layer 23 is made of an Fe alloy, which is ferritic stainless steel containing at least about 16% and not more than about 18% of Cr.

According to the first embodiment, the metal substrate 2 is so formed that a thickness t1 thereof in the thickness direction (direction Z) is about 100 μm, as shown in FIG. 3. The Cu layer 22 is so formed that a thickness t2 thereof in the thickness direction (direction Z) is about 40 μm, i.e., about 40% of the thickness t1 of the metal substrate 2. The thickness t2 of the Cu layer 22 is preferably at least about 20% (about 20 μm) and not more than about 70% (about 70 μm) of the thickness t1 of the metal substrate 2. The thickness t2 of the Cu layer 22 is more preferably at least about 30% (about 30 μm) and not more than about 60% (about 60 μm) of the thickness t1 of the metal substrate 2.

The Ti layer 21 and the stainless layer 23 are so formed that thicknesses t3 and t4 thereof in the thickness direction (direction Z) are substantially identical to each other. In other words, the Ti layer 21 and the stainless layer 23 are so formed that both of the thicknesses t3 and t4 thereof are about 30 μm, i.e., about 30% of the thickness t1 of the metal substrate 2. The thickness t3 of the Ti layer 21 is preferably at least about 20% (about 20 μm) of the thickness t1 of the metal substrate 2. The platinum catalyst layer 13 formed on the upper surface 2a of the Ti layer 21 is so formed that a thickness t5 (see FIG. 4) thereof is at least about 1 nm and not more than 300 nm.

Volume resistivity R1 of the Ti layer 21 is about $54 \times 10^{-8} \Omega \times m$. Volume resistivity R2 of the Cu layer 22 is about $1.7 \times 10^{-8} \Omega \times m$. Volume resistivity R3 of the stainless layer 23 is about $60 \times 10^{-8} \Omega \times m$. In other words, the metal substrate 2 is so formed that the volume resistivity R2 of the Cu layer 22 is not more than about 1/20 of the volume resistivity R1 of the Ti layer 21 and the volume resistivity R3 of the stainless layer 23.

The thermal expansion coefficient of the Ti layer 21 is about $8.9 \times 10^{-6}/^\circ$ C. The thermal expansion coefficient of the Cu layer 22 is about $17 \times 10^{-6}/^\circ$ C. The thermal expansion coefficient of the stainless layer 23 is about $10.4 \times 10^{-6}/^\circ$ C. In other words, the difference (=about $1.5 \times 10^{-6}/^\circ$ C.) between the thermal expansion coefficients of the Ti layer 21 and the stainless layer 23 is smaller than the difference (=about $8.1 \times 10^{-6}/^\circ$ C.) between the thermal expansion coefficients of the Cu layer 22 and the stainless layer 23.

The metal substrate 2 is so formed that, in a direction X along the upper surface 2a orthogonal to the thickness direction (direction Z), combined volume resistivity Ryz in the direction X obtained by combining the volume resistivity R1 of the Ti layer 21, the volume resistivity R2 of the Cu layer 22 and the volume resistivity R3 of the stainless layer 23 with each other is about $2 \times 10^{-8} \Omega \times m$, as shown in FIG. 2. The combined volume resistivity Ryz in the direction X denotes the volume resistivity of the metal substrate 2 with respect to current Ix flowing along a direction (direction X) orthogonal to a Y-Z plane to pass through the Y-Z plane.

The direction Y and a direction obtained by combining an X-directional component and a Y-directional component with each other are those along the upper surface 2a orthogonal to the thickness direction (direction Z), similarly to the direction X. Therefore, both of combined volume resistivity in the direction Y (volume resistivity of the metal substrate 2 with respect to current flowing along the direction Y) and combined volume resistivity in the direction obtained by combining the X-directional component and the Y-directional component with each other (volume resistivity of the metal substrate 2 with respect to current flowing along the direction obtained by combining the X-directional component and the Y-directional component with each other) are identical to the combined volume resistivity Ryz in the direction X. Therefore, only the combined volume resistivity Ryz in the direction X is hereinafter taken into consideration as combined volume resistivity in a direction along the upper surface 2a orthogonal to the thickness direction (direction Z).

The metal substrate 2 is so formed that, in the thickness direction (direction Z), combined volume resistivity Rxy in the thickness direction obtained by combining the volume resistivity R1 of the Ti layer 21, the volume resistivity R2 of the Cu layer 22 and the volume resistivity R3 of the stainless layer 23 with each other is about $18 \times 10^{-8} \Omega \times m$. In other words, the metal substrate 2 is so formed that the combined volume resistivity Ryz (about $2 \times 10^{-8} \Omega \times m$) in the direction X is smaller than the combined volume resistivity Rxy (about $18 \times 10^{-8} \Omega \times m$) in the thickness direction (direction Z). The combined volume resistivity Ryz in the thickness direction denotes the volume resistivity of the metal substrate 2 with respect to current Iz flowing along the direction (thickness direction: direction Z) orthogonal to the X-Y plane to pass through the X-Y plane.

A manufacturing process for the dye-sensitized solar cell 100 according to the first embodiment of the present invention is now described with reference to FIGS. 1 and 3.

First, a rolled Ti plate (not shown) made of a nonporous material, a rolled Cu plate (not shown) and a rolled stainless plate (not shown) of SUS430 are prepared. The thickness of the Cu plate is about 40% of the total thickness of the Ti plate, the Cu plate and the stainless plate. Both of the thicknesses of the Ti plate and the stainless plate are about 30% of the total thickness of the Ti plate, the Cu plate and the stainless plate.

Then, the Ti plate, the Cu plate and the stainless plate are unrolled, stacked in this order and continuously bonded to each other with a roller (not shown). At this time, the Ti plate, the Cu plate and the stainless plate are cold-rolled with application of a prescribed pressure. Thus, the Ti layer 21 having the thickness t3 of about 30 μm, the Cu layer 22 having the thickness t2 of about 40 μm and the stainless layer 23 having the thickness t4 of about 30 μm are bonded to each other to continuously form the clad material (metal substrate 2) having the thickness t1 of about 100 μm, as shown in FIG. 3. Then, the upper surface 2a (along arrow Z1) of the clad material (metal substrate 2) closer to the platinum catalyst layer 13 is shot-blasted, as shown in FIG. 4. At this time, the irregularities are formed on the upper surface 2a of the Ti layer 21 by roughening the upper surface 2a so that the arithmetic mean roughness Ra, the ten point height of irregularities Rzjis and the surface area/plane area ratio on the upper surface 2a are about 0.22 μm, about 1.20 μm and about 1.05 respectively.

Thereafter the platinum catalyst layer 13 consisting of the thin platinum film is formed on the upper surface 2a of the clad material (metal substrate 2) by sputtering or application of paste. Thus, the platinum catalyst layer 13 is formed on the upper surface 2a having the irregularities. Then, the clad material (metal substrate 2) provided with the platinum catalyst layer 13 is continuously formed and taken up in the form of a roll.

On the other hand, the upper electrode 12 of FTO is formed on the lower surface of the prepared glass substrate 11 by sputtering or the like. Then, a coating material containing powder of particulate titanium dioxides is applied onto the lower surface of the upper electrode 12, and thereafter dried and fired. Thus, the particulate titanium dioxides 12a are fixed onto the lower surface of the upper electrode 12. Then, the glass substrate 11 is dipped in a solution containing a pigment such as a ruthenium complex, thereby adsorbing the light-absorbing portions 12b consisting of the pigment to the surfaces of the titanium dioxides 12a. Thus, the glass substrate 11 provided with the upper electrode 12, the titanium dioxides 12a and the light-absorbing portions 12b is formed. Then, the sealing material 15 is arranged on the lower surface of the glass substrate 11 at a prescribed interval.

Thereafter the glass substrate 11 is arranged on the upper surface 2a of the unrolled clad material (metal substrate 2), so that the glass substrate 11 and the clad material (metal substrate 2) are at a prescribed interval. Then, the clad material is cut on positions corresponding to both end portions of the glass substrate 11, and the iodine electrolyte 14 is thereafter charged into the space defined by the glass substrate 11, the metal substrate 2 and the sealing material 15, thereby forming the solar cell element 1. Finally, the terminals 3a and 3b are connected to the upper electrode 12 and the metal substrate 2 respectively, thereby manufacturing the dye-sensitized solar cell 100 shown in FIG. 1.

According to the first embodiment, as hereinabove described, the metal substrate 2 serving as the anode of the solar cell element 1 includes the nonporous Ti layer 21 and the Cu layer 22, made of Cu having the volume resistivity R2 (about $1.7 \times 10^{-8} \Omega \times m$) lower than the volume resistivity R1 (about $54 \times 10^{-8} \Omega \times m$) of the Ti layer 21, bonded to the Ti layer 21 so that the metal substrate 2 is partially formed by the Cu layer 22 made of Cu having lower electrical resistance than the Ti layer 21 dissimilarly to a case where the metal substrate 2 is formed by only the Ti layer 21, whereby electrical resistance of the metal substrate 2 can be reduced below that of a metal substrate formed by only a Ti layer. Thus, electrical loss in the metal substrate 2 can be inhibited from increase. Consequently, power generation efficiency of the dye-sensitized solar cell 100 can be improved as compared with the case where the metal substrate 2 is formed by only the Ti layer 21.

According to the first embodiment, as hereinabove described, the Ti layer 21 is made of Ti having corrosion resistance against the iodine electrolyte 14 and the Cu layer 22 is bonded to the side of the Ti layer 21 opposite to the solar cell element 1, whereby the solar cell element 1 can keep corrosion resistance against the iodine electrolyte 14 also when the Cu layer 22 is formed on the metal substrate 2. Consequently, the power generation efficiency of the dye-sensitized solar cell 100 can be improved while keeping the corrosion resistance of the solar cell element 1 against the iodine electrolyte 14.

According to the first embodiment, as hereinabove described, the combined volume resistivity Ryz (=about $2 \times 10^{-8} \Omega \times m$) in the direction X along the upper surface 2a orthogonal to the thickness direction (direction Z) is set to be smaller than the combined volume resistivity Rxy (=about $18 \times 10^{-8} \Omega \times m$) in the thickness direction (direction Z) so that current can be fed in the direction X with smaller electrical loss than in the thickness direction (direction Z), whereby the current can be easily fed in the direction (direction X) along the upper surface 2a of the metal substrate 2 in the form of a flat plate.

According to the first embodiment, as hereinabove described, the difference (=about $1.5 \times 10^{-6}/°C.$) between the thermal expansion coefficients of the Ti layer 21 and the stainless layer 23 of SUS430 is set to be smaller than the difference (=about $8.1 \times 10^{-6}/°C.$) between the thermal expansion coefficients of the Cu layer 22 and the stainless layer 23, whereby the stainless layer 23 of SUS430 having the thermal expansion coefficient close to that of the Ti layer 21 can inhibit the overall metal substrate 2 from deformation resulting from deformation of the Cu layer 22 with respect to the Ti layer 21 when the metal substrate 2 is thermally deformed.

According to the first embodiment, as hereinabove described, the stainless layer 23 is made of the ferritic stainless steel having higher corrosion resistance than Cu constituting the Cu layer 22, whereby the stainless layer 23 can inhibit the Cu layer 22 from corrosion resulting from the external environment or the like.

According to the first embodiment, as hereinabove described, both of the thicknesses t3 and t4 of the Ti layer 21 and the stainless layer 23 are set to about 30% (about 30 µm) of the thickness t1 (about 100 µm) of the metal substrate 2, whereby the stainless layer 23 having the thermal expansion coefficient close to that of the Ti layer 21 as well as the thickness t4 identical to the thickness t3 of the Ti layer 21 can further inhibit the overall metal substrate 2 from deformation. Further, the process of forming the clad material by bonding the Ti layer 21, the Cu layer 22 and the stainless layer 23 to each other can be inhibited from becoming difficult due to different thicknesses t3 and t4 of the Ti layer 21 and the stainless layer 23.

According to the first embodiment, as hereinabove described, the thickness t2 of the Cu layer 22 is set to about 40% (about 40 µm) of the thickness t1 (about 100 µm) of the metal substrate 2 so that a region occupied by the Cu layer 22 made of Cu having low electrical resistance can be enlarged to some extent, whereby the electrical resistance of the overall metal substrate 2 can be more reduced. Further, the region occupied by the Cu layer 22 can be inhibited from excess enlargement, whereby the Ti layer 21 can be prevented from a defect such as breakage resulting from an excessively small region occupied by the Ti layer 21. In addition, the metal substrate 2 can be inhibited from being easily deformed due to excess enlargement of the region occupied by the Cu layer 22 causing extreme thermal deformation.

According to the first embodiment, as hereinabove described, the volume resistivity R2 of the Cu layer 22 is set to not more than about 1/20 of the volume resistivity R1 of the Ti layer 21 and the volume resistivity R3 of the stainless layer 23 so that the electrical resistance of the metal substrate 2 including the Ti layer 21, the Cu layer 22 and the stainless layer 23 can be effectively reduced, whereby electrical loss in the metal substrate 2 can be effectively inhibited from increase.

According to the first embodiment, as hereinabove described, the irregularities are formed on the upper surface 2a of the Ti layer 21 closer to the platinum catalyst layer 13 by roughening the upper surface 2a so that the surface area of the upper surface 2a covered with the platinum catalyst layer 13 can be increased due to the irregularities, whereby the surface area of the platinum catalyst layer 13 can be increased. Consequently, electrons can be more easily transferred through the platinum catalyst layer 13, whereby the power generation efficiency of the dye-sensitized solar cell 100 can be more improved.

According to the first embodiment, as hereinabove described, the metal substrate 1 is so formed that the arithmetic mean roughness Ra, the ten point height of irregularities Rzjis and the surface area/plane area ratio on the upper surface 2a of the Ti layer 21 closer to the platinum catalyst layer 13 are about 0.22 µm, about 1.20 µm and about 1.05 respectively so that the surface area of the upper surface 2a covered with the platinum catalyst layer 13 can be effectively increased due to the irregularities of the upper surface 2a, whereby the surface area of the platinum catalyst layer 13 can be effectively increased.

Second Embodiment

The structure of a dye-sensitized solar cell 200, according to a second embodiment of the present invention is now described with reference to FIGS. 1 and 5. In the dye-sensitized solar cell 200 according to the second embodiment, a metal substrate 202 is constituted of a clad material having a two-layer structure obtained by bonding a Ti layer 221 and a Cu layer 222 to each other, dissimilarly to the aforementioned first embodiment.

Figures 5, 6:
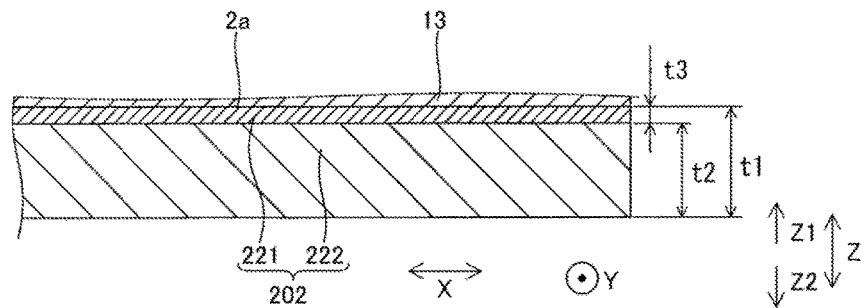
FIG. 5 is a sectional view showing the structure of a metal substrate according to a second embodiment of the present invention.
FIG. 6 illustrates calculated values of volume resistivity in metal substrates having three-layer structures in a simulation conducted in order to confirm effects of the present invention.

The metal substrate 202 of the dye-sensitized solar cell 200 (see FIG. 1) according to the second embodiment of the present invention is formed by arranging the Ti layer 221 and the Cu layer 222 successively from the upper side (along arrow Z1) closer to a solar cell element 1 (see FIG. 1), as shown in FIG. 5. In other words, the Ti layer 221 is arranged in a state in contact with the lower surface of a platinum catalyst layer 13. The metal substrate 202 is an example of the "clad material" or the "metal substrate for a dye-sensitized solar cell" in the present invention. The Ti layer 221 is an example of the "first metal layer" in the present invention, and the Cu layer 222 is an example of the "second metal layer" in the present invention.

The metal substrate 202 is constituted of the clad material having the two-layer structure obtained by bonding the Ti layer 221 and the Cu layer 222, provided in the form of flat plates respectively, in a state stacked in the thickness direction (direction Z) to each other. The Ti layer 221 is made of nonporous Ti, and the Cu layer 222 is made of Cu.

According to the second embodiment, the Cu layer 222 is so formed that a thickness t2 thereof in the thickness direction (direction Z) is about 70 μm, i.e., about 70% of the thickness t1 (about 100 μm) of the metal substrate 202. The thickness t2 of the Cu layer 222 is preferably at least about 20% (about 20 μm) and not more than about 85% (about 85 μm) of the thickness t1 of the metal substrate 202. The thickness t2 of the Cu layer 222 is more preferably at least about 50% (about 50 μm) and not more than about 80% (about 80 μm) of the thickness t1 of the metal substrate 202.

The Ti layer 221 is so formed that a thickness t3 thereof in the thickness direction (direction Z) is about 30 μm, i.e., about 30% of the thickness t1 (about 100 μm) of the metal substrate 202. The thickness t3 of the Ti layer 221 is preferably at least about 15% (about 15 μm) of the thickness t1 of the metal substrate 202. The remaining structure of the dye-sensitized solar cell 200 according to the second embodiment is substantially similar to that of the dye-sensitized solar cell 100 according to the aforementioned first embodiment.

A manufacturing process for the dye-sensitized solar cell 200 according to the second embodiment of the present invention is now described with reference to FIG. 5.

First, a rolled Ti plate (not shown) made of a nonporous material and a rolled Cu plate (not shown) are prepared. The thickness of the Cu plate is about 70% of the total thickness of the Ti plate and the Cu plate. The thickness of the Ti plate is about 30% of the total thickness of the Ti plate and the Cu plate.

The Ti plate and the Cu plate are unrolled, stacked with each other and continuously bonded to each other with a roller (not shown). At this time, the Ti plate and the Cu plate are cold-rolled with application of a prescribed pressure. Thus, the Ti layer 221 having the thickness t3 of about 30 μm and the Cu layer 222 having the thickness t2 of about 70 μm are bonded to each other to continuously form the clad material (metal substrate 200) having the thickness t1 of about 100 μm, as shown in FIG. 5. The remaining manufacturing process for the dye-sensitized solar cell 200 according to the second embodiment is similar to that in the aforementioned first embodiment.

According to the second embodiment, as hereinabove described, the metal substrate 202 includes the nonporous Ti layer 221 and the Cu layer 222, made of Cu having volume resistivity R2 (about $1.7 \times 10^{-8} \Omega \times m$) lower than volume resistivity R1 (about $54 \times 10^{-8} \Omega \times m$) of the Ti layer 221, bonded to the Ti layer 221, whereby electrical resistance of the metal substrate 202 can be reduced below that of a metal substrate formed by only a Ti layer. Thus, electrical loss in the metal substrate 202 can be inhibited from increase, whereby power generation efficiency of the dye-sensitized solar cell 200 can be improved.

According to the second embodiment, as hereinabove described, the Ti layer 221 is made of Ti having corrosion resistance against an iodine electrolyte 14 and the Cu layer 222 is bonded to a side of the Ti layer 221 opposite to a solar cell element 1, whereby the solar cell element 1 can keep corrosion resistance against the iodine electrolyte 14 also when the Cu layer 222 is formed on the metal substrate 202.

According to the second embodiment, as hereinabove described, the thickness t2 of the Cu layer 222 is set to about 70% (about 70 μm) of the thickness t1 (about 100 μm) of the metal substrate 202 so that a region occupied by the Cu layer 222 made of Cu having low electrical resistance can be enlarged, whereby electrical resistance of the overall metal substrate 202 can be more reduced.

According to the second embodiment, as hereinabove described, the thickness t3 of the Ti layer 221 is set to about 30% (about 30 μm) of the thickness t1 (about 100 μm) of the metal substrate 202 so that the thickness t3 of the Ti layer 221 can be inhibited from excess reduction, whereby the Ti layer 221 can be inhibited from a defect such as breakage resulting from an excessively small thickness t3 of the Ti layer 221. Further, the metal substrate 202 can be inhibited from being easily deformed due to excess enlargement of the region occupied by the Cu layer 222 causing excessive thermal deformation. The remaining effects of the second embodiment are similar to those of the aforementioned first embodiment.

Examples

A simulation and measurement of volume resistivity and measurement of power generation efficiency conducted in order to confirm effects of the present invention are now described with reference to FIGS. 2 to 13. More specifically, the simulation of volume resistivity was conducted on samples of the metal substrate 2 having the three-layer structure according to the aforementioned first embodiment and the metal substrate 202 having the two-layer structure according to the aforementioned second embodiment. In each of the samples of the metal substrate 2 having the three-layer structure according to the aforementioned first embodiment, further, volume resistivity in a direction along an upper surface 2a of a metal substrate 2, power generation efficiency of a dye-sensitized solar cell 100 prepared with the metal substrate 2, and power generation efficiency of the dye-sensitized solar cell 100 whose metal substrate 2 was varied in surface roughness were measured.

(Simulation of Volume Resistivity)

In the simulation of volume resistivity in the samples of metal substrates having three-layer structures described below, metal substrates 2 constituted of clad materials having three-layer structures obtained by bonding Ti layers 21, Cu layers 22 and stainless layers 23, provided in the form of flat plates respectively, to each other in a state stacked with each other in the thickness directions were assumed as those according to Examples 1 to 9 corresponding to the metal substrate 2 according to the aforementioned first embodiment, as shown in FIG. 6. In the metal substrates 2 according to Examples 1 to 9, thicknesses t2 (see FIG. 3) of the Cu layers 22 were assumed to be 10%, 20%, 30%, 40%, 50%, 60%, 70%, 80% and 90% of thicknesses t1 (see FIG.

3) of the metal substrates 2 respectively. In the metal substrates 2 according to Examples 1 to 9, further, thicknesses t3 and t4 (see FIG. 3) of the Ti layers 21 and the stainless layers 23 were assumed to be identical to each other. Therefore, the metal substrates 2 according to Examples 1 to 9 were so modeled that the thicknesses t3 and t4 of the Ti layers 21 and the stainless layers 23 were 45%, 40%, 35%, 30%, 25%, 20%, 15%, 10% and 5% of the thicknesses t1 of the metal substrates 2 respectively.

On the other hand, a metal substrate (including no Cu layer) constituted of a clad material having a two-layer structure obtained by bonding a Ti layer and a stainless layer to each other in a state stacked with each other in the thickness direction was assumed as that according to comparative example 1 with respect to Examples 1 to 9. In the metal substrate according to comparative example 1, both of the thicknesses of the Ti layer and the stainless layer were assumed to be 50% of the thickness of the metal substrate.

Figures 7, 8:
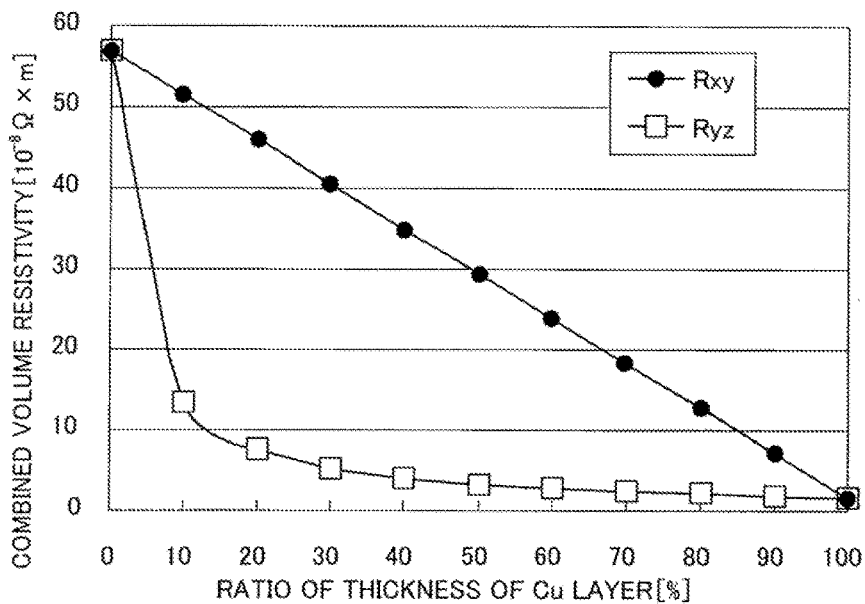
FIG. 7 is a graph showing measured values of the volume resistivity in the metal substrates having the three-layer structures in the simulation conducted in order to confirm effects of the present invention.
FIG. 8 illustrates calculated values of volume resistivity in metal substrates having two-layer structures in a simulation conducted in order to confirm effects of the present invention.
Figure 9:
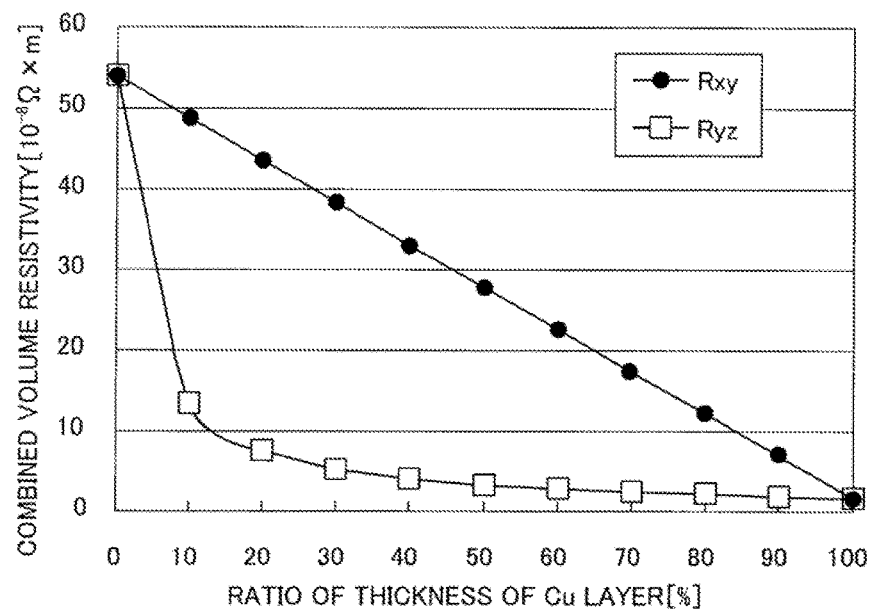
FIG. 9 is a graph showing measured values of the volume resistivity in the metal substrates having two-layer structures in the simulation conducted in order to confirm effects of the present invention.
Figure 10:
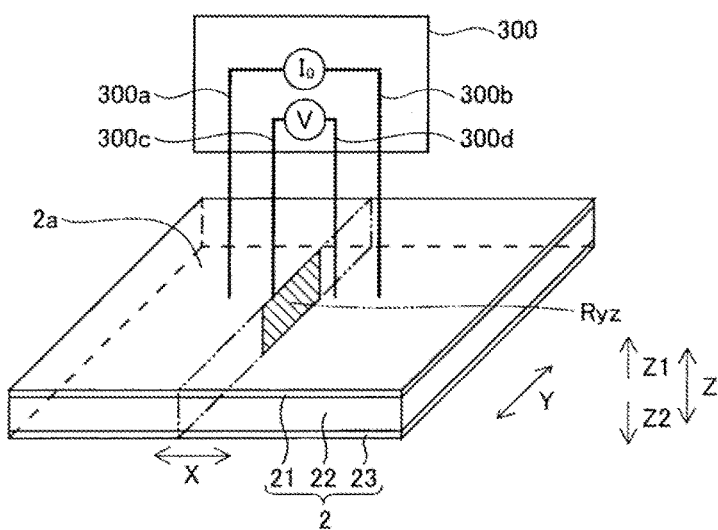
FIG. 10 is a perspective view showing a method of measuring volume resistivity in a direction along the upper surface of a metal substrate having a three-layer structure in measurement conducted in order to confirm effects of the present invention.

In the simulation of volume resistivity in the samples of metal substrates having two-layer structures, metal substrates 202 constituted of clad materials having two-layer structures obtained by bonding Ti layers 221 and Cu layers 222, provided in the form of flat plates, to each other in a state stacked with each other in the thickness directions were assumed as those according to Examples 10 to 18 corresponding to the metal substrate 202 according to the aforementioned second embodiment, as shown in FIG. 8. In the metal substrates 202 according to Examples 10 to 18, thicknesses t2 (see FIG. 3) of the Cu layers 22 were assumed to be 10%, 20%, 30%, 40%, 50%, 60%, 70%, 80% and 90% of thicknesses t1 (see FIG. 3) of the metal substrates 202 respectively. Further, the metal substrates 202 according to Examples 10 to 18 were so modeled that thicknesses t3 (see FIG. 3) of the Ti layers 221 were 90%, 80%, 70%, 60%, 50%, 40%, 30%, 20% and 10% of the thicknesses t1 of the metal substrates 202 respectively.

On the other hand, a metal substrate (including neither Ti layer nor stainless layer) consisting of only a Cu layer was assumed as that according to comparative example 2 with respect to Examples 1 to 18. Further, a metal substrate (including no Cu layer) consisting of only a Ti layer was assumed as that according to comparative example 3 with respect to Examples 10 to 18.

In the simulation of volume resistivity, combined volume resistivity Ryz in the direction (direction X) along the upper surface of the metal substrate and combined volume resistivity Rxy in the thickness direction (direction Z) were calculated in each of the metal substrates 2 and 202 according to Examples 1 to 18 and the metal substrates according to comparative examples 1 to 3. The combined volume resistivity Ryz in the direction was obtained according to the following equation:

$$1/Ryz = a/R1 + b/R2 + c/R3$$

The combined volume resistivity Rxy in the direction Z was obtained according to the following equation:

$$Rxy = a \times R1 + b \times R2 + c \times R3$$

In each of the above equations, $a$, b and c represent the ratios of the thicknesses of the Ti layer, the Cu layer and the stainless layer to the thickness of the metal substrate respectively, and R1, R2 and R3 represent the values of the volume resistivity of the Ti layer, the Cu layer and the stainless layer respectively. R1, R2 and R3 were set to $54 \times 10^{-8} \Omega \times m$, $1.7 \times 10^{-8} \Omega \times m$ and $60 \times 10^{-8} \Omega \times m$ respectively.

From the results of the simulation conducted on the metal substrates 2 according to Examples 1 to 9 and the metal substrates according to comparative examples 1 and 2 shown in FIGS. 6 and 7, it has been recognized that both of the combined volume resistivity Ryz in the direction X and the combined volume resistivity Rxy in the direction Z are more reduced as compared with the metal substrate (comparative example 1) having the two-layer structure including no Cu layer when the Cu layer 22 is formed on the metal substrate 2 having the three-layer structure. From the results of the simulation conducted on the metal substrates 202 according to Examples 10 to 18 and the metal substrates according to comparative examples 2 and 3 shown in FIGS. 8 and 9, it has also been recognized that both of the combined volume resistivity Ryz in the direction X and the combined volume resistivity Rxy in the direction Z are more reduced as compared with the metal substrate (comparative example 3) of the single-layer structure including no Cu layer when the Cu layer 222 is formed on the metal substrate 202 having the two-layer structure. From these results, it has been recognized that electrical loss in the metal substrate 2 or 202 can be inhibited from increase by forming the Cu layer 22 or 222 on the metal substrate 2 or 202.

From the results of the simulation conducted on the metal substrates 2 and 202 according to Examples 1 to 18 and the metal substrates according to comparative examples 1 to 3 shown in FIGS. 6 to 9, it has been recognized that both of the combined resistivity Ryz and the combined resistivity Rxy can be reduced by increasing the ratio of the thickness of the Cu layer 22 or 222 made of Cu having small volume resistivity. It has also been recognized that the amount of change in the combined volume resistivity Ryz in the direction X increases in a region where the ratio of the thickness of the Cu layer 22 or 222 is small and decreases in a region where the ratio of the thickness of the Cu layer 22 or 222 is large.

From the results of the simulation conducted on the metal substrates 2 and 202 according to Examples 2 to 9 and 11 to 18 and the metal substrate according to comparative example 2 shown in FIGS. 6 to 9, it has been proved as possible to set the combined volume resistivity Ryz in the direction X to not more than $8 \times 10^{-8} \Omega \times m$ by setting the thickness of the Cu layer 22 or 222 to at least 20% of that of the metal substrate 2 or 202. Thus, it has been proved as possible to more suppress increase in electrical loss when feeding current mainly in the direction X by setting the thickness of the Cu layer 22 or 222 to at least 20% of that of the metal substrate 2 or 202. Therefore, electrical loss in the metal substrate 2 or 202 can be inhibited from increase when the thickness of the Cu layer 22 or 222 is at least 20% of that of the metal substrate 2 or 202 even if the area of an X-Y plane (upper surface) of the metal substrate 2 or 202 orthogonal to the thickness direction is increased following size increase of the solar cell element 1, and hence a larger quantity of electricity can conceivably be obtained from the dye-sensitized solar cell 100 or 200 increased in size.

From the results of the simulation conducted on the metal substrates 2 and 202 according to Examples 5 to 9 and 14 to 18 and the metal substrate according to comparative example 2, it has been proved as possible to set the combined volume resistivity Ryz in the direction to not more than $4 \times 10^{-8} \Omega \times m$ by setting the thickness of the Cu layer 22 or 222 to at least 50% of that of the metal substrate 2 or 202. Thus, it has been proved as possible to further suppress increase in electrical loss when feeding current mainly in the direction X by setting the thickness of the Cu layer 22 or 222 to at least 50% of that of the metal substrate 2 or 202.

(Measurement of Volume Resistivity in Direction Along Upper Surface of Metal Substrate)

In the measurement of volume resistivity in the direction along the upper surface of the metal substrate described below, metal substrates 2 corresponding to the metal substrate 2 according to the aforementioned first embodiment were prepared in practice and subjected to the measurement of volume resistivity. More specifically, Ti plates 21 made of a nonporous material, Cu plates 22 and stainless plates 23 of SUS430 were prepared. Then, the Ti plates 21, the Cu plates 22 and the stainless plates 23 were stacked in this order and continuously bonded to each other with a roller. At this time, the Ti plates 21, the Cu plates 22 and the stainless plates 23 were cold-rolled with application of a prescribed pressure. Thus, six metal substrates 2 according to Example 2a, six metal substrates 2 according to Example 4a and six metal substrates 2 according to Example 6a (18 metal substrates 2 in total) were prepared correspondingly to the metal substrate 2 according to the aforementioned first embodiment.

The metal substrates 2 according to Example 2a corresponding to Example 2 (see FIG. 6) in the aforementioned simulation were so formed that the thicknesses of the Cu plates 22 were 20% of the total thicknesses of the Ti plates 21, the Cu plates 22 and the stainless plates 23 and the thicknesses of the Ti plates 21 and the stainless plates 23 were 40% (twice the thicknesses of the Cu plates 22) of the total thicknesses of the Ti plates 21, the Cu plates 22 and the stainless plates 23.

The metal substrates 2 according to Example 4a corresponding to Example 4 (see FIG. 6) in the aforementioned simulation were so formed that the thicknesses of the Cu plates 22 were 40% of the total thicknesses of the Ti plates 21, the Cu plates 22 and the stainless plates 23 and the thicknesses of the Ti plates 21 and the stainless plates 23 were 30% (¾ times the thicknesses of the Cu plates 22) of the total thicknesses of the Ti plates 21, the Cu plates 22 and the stainless plates 23.

The metal substrates 2 according to Example 6a corresponding to Example 6 (see FIG. 6) in the aforementioned simulation were so formed that the thicknesses of the Cu plates 22 were 60% of the total thicknesses of the Ti plates 21, the Cu plates 22 and the stainless plates 23 and the thicknesses of the Ti plates 21 and the stainless plates 23 were 20% (¼ times the thicknesses of the Cu plates 22) of the total thicknesses of the Ti plates 21, the Cu plates 22 and the stainless plates 23.

In each of the prepared 18 metal substrates 2 (the six metal substrates 2 according to Example 2a, the six metal substrates 2 according to Example 4a and the six metal substrates 2 according to Example 6a), thicknesses t3, t2, t4 and t1 of the Ti layers 21, the Cu layers 22, the stainless layers 23 and the metal substrates t1 were measured according to a prescribed method of measurement.

In each of the prepared 18 metal substrates 2, further, combined volume resistivity Ryz in a direction X along an upper surface 2a was measured according to a four-point probe method. More specifically, the combined volume resistivity Ryz in the direction X was calculated by measuring potential difference V between inner probes $300c$ and $300d$ among probes $300a$ to $300d$ of a volume resistivity measuring apparatus 300 shown in FIG. 10 when feeding constant current $I_c$ between the outer probes $300a$ and $300b$.

In each of Examples 2a, 4a and 6a, averages of the results (the thicknesses t3, t2, t4 and t1 of the Ti layers 21, the Cu layers 22, the stainless layers 23 and the metal substrates 2 and values of the combined volume resistivity Ryz in the direction X) of the measurement conducted on the six metal substrates 2 were calculated.

From the results of the measurement conducted on the metal substrates 2 according to Examples 2a, 4a and 6a shown in FIG. 11, it has been recognized that the combined volume resistivity Ryz in the direction X is smaller than volume resistivity ($57 \times 10^{-8} \Omega \times m$: comparative example 1) of the metal substrate consisting of only the Ti layer and the stainless layer and volume resistivity ($54 \times 10^{-8} \Omega \times m$: comparative example 3) of the metal substrate consisting of only the Ti layer also in the actual measurement. Thus, it has been proved as possible to reduce the combined volume resistivity Ryz in the direction X as compared with a case where the metal substrate 2 includes no Cu layer 22 (the case where the metal substrate consists of only the Ti layer and the stainless layer or the case where the metal substrate consists of only the Ti layer) by forming the Cu layer 22 on the metal substrate 2 in practice.

From experimental results (observed values) of the metal substrates 2 according to Examples 2a, 4a and 6a and the results (calculated values) of the simulation of volume resistivity conducted on the metal substrates 2 according to Examples 2, 4 and 6, it has been recognized that the observed value of the combined volume resistivity Ryz in the direction X is larger than the calculated value. This is conceivably because compounds are generated on the interfaces between the layers 21, 22 and 23 of the clad material.

It has also been recognized that the difference ($=8.76 \times 10^{-8} \Omega \times m$) between the observed value and the calculated value of the combined volume resistivity Ryz in the case where the ratio of the thickness t2 of the Cu layer 22 is small (each of Examples 2 and 2a) is larger than the difference ($=0.57 \times 10^{-6} \Omega \times m$) between the observed value and the calculated value of the combined volume resistivity Ryz in the case where the ratio of the thickness t2 of the Cu layer 22 is large (each of Examples 6 and 6a). Electrical resistance in passage through the Ti layer 21 is added to the observed value of the combined volume resistivity Ryz as described above, and hence the electrical resistance in passage through the Ti layer 21 is larger in the metal substrate 2 according to each of Examples 2 and 2a including the Ti layer 21 having the thickness t3 at the large ratio as compared with the metal substrate 2 according to each of Examples 6 and 6a including the Ti layer 21 having the thickness t3 at the small ratio. This is conceivably the reason why the difference between the observed value and the calculated value of the combined volume resistivity Ryz in the case where the ratio of the thickness t2 of the Cu layer 22 is small is larger than the difference between the observed value and the calculated value of the combined volume resistivity Ryz in the case where the ratio of the thickness t2 of the Cu layer 22 is large.

(Measurement of Power Generation Efficiency at Various Ratios of Thickness of Cu Layer)

In measurement of power generation efficiency at various ratios of thicknesses of Cu layers described below, metal substrates 2 constituted of clad materials having three-layer structures obtained by bonding Ti layers 21, Cu layers 22 and stainless layers 23, provided in the form of flat plates, to each other in a state stacked with each other in the thickness directions were prepared as those according to Examples 2b to 7b corresponding to the metal substrate 2 according to the aforementioned first embodiment, as shown in FIG. 12. In the metal substrates 2 according to Examples 2b to 7b, thicknesses t1 (see FIG. 3) and areas of X-Y planes (see FIG. 2) orthogonal to the thickness directions were set to be identical to each other.

In the metal substrates 2 according to Examples 2b to 7b, thicknesses t2 (see FIG. 3) of the Cu layers 22 were set to 20%, 30%, 40%, 50%, 60% and 70% of the thicknesses t1 (see FIG. 3) of the metal substrates 2 respectively. In the metal substrates 2 according to Examples 2b to 7b, further, thicknesses t3 and t4 (see FIG. 3) of the Ti layers 21 and the stainless layers 23 were set to be identical to each other. More specifically, the thicknesses t3 and t4 of the Ti layers 21 and the stainless layers 23 were set to 40%, 35%, 30%, 25%, 20% and 15% of the thicknesses t1 of the metal substrates 2 in the metal substrates 2 according to Examples 2b to 7b respectively.

On the other hand, a metal substrate formed by only a Ti layer provided in the form of a flat plate was prepared as that according to comparative example 4 with respect to Examples 2b to 7b. At this time, the thickness of the metal substrate according to comparative example 4 was set to be identical to the thicknesses t1 (see FIG. 3) of the metal substrates 2 according to Examples 2b to 7b. Further, the area of an X-Y, plane orthogonal to the thickness direction of the metal substrate according to comparative example 4 was set to be identical to the areas of the X-Y planes (see FIG. 2) orthogonal to the thickness directions of the metal substrates 2 according to Examples 2b to 7b. In other words, the metal substrate according to comparative example 4 was different from the metal substrates 2 according to Examples 2b to 7b only in the point that the same was formed by only the Ti layer.

Then, dye-sensitized solar cells 100 corresponding to Examples 2b to 7b and a dye-sensitized solar cell corresponding to comparative example 4 were prepared through manufacturing processes similar to that for the dye-sensitized solar cell 100 according to the aforementioned first embodiment respectively. Thereafter values of power generation efficiency of the dye-sensitized solar cells 100 according to Examples 2b to 7b were measured with reference to power generation efficiency (100%) of the dye-sensitized solar cell corresponding to comparative example 4 under the same conditions.

From the results of Examples 2b to 7b and comparative example 4 shown in FIG. 12, it has been recognized that the power generation efficiency of the dye-sensitized solar cell 100 (each of Examples 2b to 7b, power generation efficiency: at least 110% and not more than 115%) is increased as compared with the dye-sensitized solar cell (comparative example 4, power generation efficiency: 100%) having the metal substrate formed by only the Ti layer when the Cu layer 22 is formed on the metal substrate 2. This is because both of combined volume resistivity Ryz in a direction X and combined volume resistivity Rxy in a direction Z in the metal substrate 2 (each of Examples 2b to 7b) including the Cu layer 22 are smaller than those in the metal substrate (comparative example 4) formed by only the Ti layer and hence electrical loss in the metal substrate 2 is inhibited from increase. Therefore, the power generation efficiency in the dye-sensitized solar cell 100 corresponding to each of Examples 2b to 7b was conceivably increased as compared with the dye-sensitized solar cell corresponding to comparative example 4.

From the results of Examples 5b to 7b, it has been recognized that the power generation efficiency of the dye-sensitized solar cell 100 remains substantially unchanged (115%) when the thickness t2 of the Cu layer 22 is at feast 50% of the thickness t1 of the metal substrate 2. In other words, it has been proved that the thickness t2 of the Cu layer 22 is preferably at least 50% of the thickness t1 of the metal substrate 2. This is conceivably because change in the combined volume resistivity Ryz in the direction X is extremely small in a region where the ratio of the thickness t2 of the Cu layer 22 is at least 50% and electrical resistance is not much changed when current flows in the direction X, as understood from the graph of the simulation of the combined volume resistivity shown in FIG. 7.

From the results of Examples 2b to 7b, it has been confirmable that the power generation efficiency of the dye-sensitized solar cell 100 can be more increased as compared with the case where the thickness t2 of the Cu layer 22 is 20% of the thickness t1 of the metal substrate 2 (Example 2b, power generation efficiency: 110%) when the thickness t2 of the Cu layer 22 is at least 30% of the thickness t1 of the metal substrate 2 (each of Examples 3b to 7b, power generation efficiency: at least 113% and not more than 115%). Further, it has been confirmable that the power generation efficiency of the dye-sensitized solar cell 100 can be further increased when the thickness t2 of the Cu layer 22 is at least 50% of the thickness t1 of the metal substrate 2 (each of Examples 5b to 7b, power generation efficiency: 115%).

(Measurement of Power Generation Efficiency at Various Values of Surface Roughness of Metal Substrate)

In measurement of power generation efficiency at various values of surface roughness of metal substrates described below, three metal substrates 2 according to Example 4b corresponding to the metal substrate 2 according to the aforementioned first embodiment were prepared. In other words, the metal substrates 2 were so prepared that thicknesses t2 (see FIG. 3) of Cu layers 22 were 40% of thicknesses t1 (see FIG. 3) of the metal substrates 2 and thicknesses t3 and t4 (see FIG. 3) of Ti layers 21 and stainless layers 23 were 30% of the thicknesses t1 of the metal substrates 2.

Then, upper surfaces 2b of the Ti layers 21 of two of the three metal substrates 2 according to Example 4b were shot-blasted, thereby preparing metal substrates 2 according to Examples 4c and 4d having upper surfaces 2a exhibiting larger values of surface roughness than the upper surface 2a of the metal substrate 2 according to Example 4b. At this time, the metal substrates 2 were so prepared that the surface roughness of the upper surface 2a of the metal substrate 2 according to Example 4d was larger than that of the upper surface 2a of the metal substrate 2 according to Example 4c.

Thereafter the surface roughness of the upper surface 2a of the metal substrate 2 according to each of Examples 4b, 4c and 4d was measured. More specifically, arithmetic mean roughness Ra and ten point height of irregularities Rzjis of the upper surface 2a were measured with a contact surface roughness measuring apparatus (surfcom 480A by Tokyo Seimitsu Co., Ltd.), and the surface area was measured with a laser microscope (VK-9700 by Keyence Corporation). The surface area was measured in a surface shape measurement mode with an objective lens of 50 magnifications, to attain hyperprecise measurement quality. A surface area/plane area ratio was obtained by dividing the surface area of the metal substrate 2 in an arbitrary square region of 240 μm square by a plane area (240×240 μm²) of the square region.

Then, platinum catalyst layers 13 of thin platinum films were formed on the upper surfaces 2a of the metal substrates 2 according to Examples 4b, 4c and 4d by sputtering respectively. Thereafter dye-sensitized solar cells 100 corresponding to Examples 4b, 4c and 4d were prepared through manufacturing processes similar to that for the dye-sensitized solar cell 100 according to the aforementioned first embodiment respectively. Thereafter values of power generation efficiency of the dye-sensitized solar cells 100 corresponding to Examples 4c and 4d were measured with reference to power generation efficiency (100%) of the dye-sensitized solar cell 100 corresponding to Example 4b.

FIG. 13 shows experimental results of Examples 4b, 4c and 4d. Referring to FIG. 13, the triangle indicates that the power generation efficiency was at least 100% and less than 105% and not much improved. The circle indicates that the power generation efficiency was at least 105% and sufficiently improved.

From the experimental results of Examples 4b, 4c and 4d, it has been proved that the power generation efficiency can be improved by increasing the surface roughness (arithmetic mean roughness Ra, ten point height of irregularities Rzjis and surface area/plane area ratio) of the upper surface 2a of the Ti layer 21 of the metal substrate 2.

From the results of Examples 4c and 4d, it has been proved that improvement of the power generation efficiency can be expected when the upper surface 2a satisfies at least any one of arithmetic mean roughness Ra of at least 0.10 μm, ten point height of irregularities Rzjis of at least 0.50 μm and a surface area/plane area ratio of at least 1.03. It has also been proved that the power generation efficiency is sufficiently improved particularly when the upper surface 2a has arithmetic mean roughness Ra of at least 0.22 μm, ten point height of irregularities Rzjis of at least 1.20 μm and a surface area/plane area ratio of at least 1.05. When the surface roughness of the upper surface 2a of the Ti layer 21 included in the metal substrate 2 was increased, the quantity of platinum in the platinum catalyst layer 13 adhering to the upper surface 2a of the Ti layer 21 was increased. Thus, electrons were conceivably further transferred through the platinum.

Although the present invention has been described and illustrated in detail, it is clearly understood that the same is by way of illustration and example only and is not to be taken by way of limitation, the spirit and scope of the present invention being limited only by the terms of the appended claims.

For example, while the "first metal layer" in the present invention is constituted of the Ti layer 21 (221) of nonporous Ti in each of the aforementioned first and second embodiments, the present invention is not restricted to this. Alternatively, the metal substrate may be so formed that the "first metal layer" in the present invention is made of a nonporous Ti alloy having corrosion resistance against an iodine electrolyte, for example.

While the "second metal layer" in the present invention is constituted of the Cu layer 22 (222) made of Cu in each of the aforementioned first and second embodiments, the present invention is not restricted to this. Alternatively, the metal substrate may be so formed that the "second metal layer" in the present invention is made of any one of a Cu alloy, Al and an Al alloy having low electrical resistance, for example.

While the "third metal layer" in the present invention is constituted of the stainless layer 23 of SUS430 in the aforementioned first embodiment, the present invention is not restricted to this. Alternatively, the metal substrate may be so formed that the "third metal layer" in the present invention is made of ferritic stainless steel other than SUS430. Further alternatively, the metal substrate may be so formed that the "third metal layer" in the present invention is made of any one of Fe other than the ferritic stainless steel, Ti and a Ti alloy, for example. When made of low-priced Fe, the third metal layer can be formed on the metal substrate at a low cost. Alternatively, the corrosion resistance of the metal substrate can be more improved when the third metal layer is made of Ti or a Ti alloy having high corrosion resistance.

While the metal substrate 2 is constituted of the clad material obtained by bonding the Ti layer 21, the Cu layer 22 and the stainless layer 23 to each other in the aforementioned first embodiment, the present invention is not restricted to this. Alternatively, the metal substrate 2 may further include an additional metal layer on the surface opposite to the Cu layer 22 in contact with the stainless layer 23, or may include the additional metal layer between the Cu layer 22 and the stainless layer 23, for example.

While the metal substrate 2 is so formed that the thicknesses t3 and t4 of the Ti layer 21 and the stainless layer 23 are substantially identical to each other in the aforementioned first embodiment, the present invention is not restricted to this. Alternatively, the thicknesses t3 and t4 of the Ti layer 21 and the stainless layer 23 may be different from each other. Ti is generally at a higher cost than SUS430 (ferritic stainless steel), and hence the thickness t3 of the Ti layer 21 is preferably set to be smaller than the thickness t4 of the stainless layer 23 in this case.

While the arithmetic mean roughness Ra, the ten point height of irregularities Rzjis and the surface area/plane area ratio on the upper surface 2a of the Ti layer 21 are about 0.22 μm, about 1.20 μm and about 1.05 respectively in the aforementioned first embodiment, the present invention is not restricted to this. Alternatively, the arithmetic mean roughness Ra, the ten point height of irregularities Rzjis and the surface area/plane area ratio on the upper surface 2a of the Ti layer 21 may be set to be larger than about 0.22 μm, larger than about 1.20 μm and larger than about 1.05 respectively.

While the arithmetic mean roughness Ra, the ten point height of irregularities Rzjis and the surface area/plane area ratio on the upper surface 2a of the Ti layer 21 may be at least about 0.10 μm, at least about 0.50 μm and at least about 1.03 respectively in the aforementioned first embodiment, the present invention is not restricted to this. Alternatively, the arithmetic mean roughness Ra, the ten point height of irregularities Rzjis and the surface area/plane area ratio on the upper surface 2a of the Ti layer 21 may be set to be at least about 0.10 μm, less than about 0.50 μm and less than about 1.03 respectively, for example. At least the surface area/plane area ratio is preferably set to at least about 1.03.

What is claimed is:

1. A metal substrate made of only metal for a dye-sensitized solar cell, comprising a three-layer clad material consisting of:
    a nonporous first metal layer, arranged on an anode side of a dye-sensitized solar cell element, made of a metal having corrosion resistance against an electrolyte of said dye-sensitized solar cell element, a thickness of said nonporous first metal layer is at least 20 μm,
    a second metal layer made of a metal having lower electrical resistance than said nonporous first metal layer and bonded to a side of said nonporous first metal layer opposite to said dye-sensitized solar cell element, and
    a third metal layer bonded to a side opposite to said nonporous first metal layer being in direct contact with said second metal layer, wherein
    said nonporous first metal layer is made of Ti,
    said second metal layer is made of Cu,
    said third metal layer is made of ferritic stainless steel containing at least about 16% and not more than about 18% of Cr, wherein the metal substrate further comprises a catalyst layer formed on a substrate surface of said nonporous first metal layer closer to said dye-sensitized solar cell element, the thickness of said nonporous first metal layer and a thickness of said third metal layer are substantially identical to each other, and a ratio of a surface area to a plane area on said substrate surface of said nonporous first metal layer closer to said dye-sensitized solar cell element is at least 1.05.

2. The metal substrate made of only metal for a dye-sensitized solar cell according to claim 1, wherein said nonporous first metal layer and said second metal layer constitute an anode of said dye-sensitized solar cell element.

3. The metal substrate made of only metal for a dye-sensitized solar cell according to claim 1, wherein a thickness of said second metal layer is at least 20% of a total thickness at least including the thickness of said nonporous first metal layer and the thickness of said second metal layer.

4. The metal substrate made of only metal for a dye-sensitized solar cell according to claim 3, wherein the thickness of said second metal layer is at least 50% of said total thickness at least including the thickness of said nonporous first metal layer and the thickness of said second metal layer.

5. The metal substrate made of only metal for a dye-sensitized solar cell according to claim 1, wherein the thickness of said nonporous first metal layer is at least 15% of a total thickness at least including the thickness of said nonporous first metal layer, and a thickness of said second metal layer.

6. The metal substrate made of only metal for a dye-sensitized solar cell according to claim 1, wherein said third metal layer is made of a metal having higher corrosion resistance than said metal constituting said second metal layer.

7. The metal substrate made of only metal for a dye-sensitized solar cell according to claim 1, wherein a thickness of said second metal layer is at least 20% and not more than 70% of a total thickness at least including the thickness of said nonporous first metal layer, the thickness of said second metal layer and a thickness of said third metal layer.

8. The metal substrate made of only metal for a dye-sensitized solar cell according to claim 7, wherein the thickness of said second metal layer is at least 30% and not more than 60% of said total thickness at least including the thickness of said nonporous first metal layer, the thickness of said second metal layer and the thickness of said third metal layer.

9. The metal substrate made of only metal for a dye-sensitized solar cell according to claim 1, wherein the electrical resistance of said second metal layer is not more than 1/20 of the electrical resistance of said nonporous first metal layer.

10. The metal substrate made of only metal for a dye-sensitized solar cell according to claim 1, wherein arithmetic mean roughness Ra is at least 0.10 µm and ten point height of irregularities Rzjis is at least 0.50 µm on said substrate surface of said nonporous first metal layer closer to said dye-sensitized solar cell element.

11. The metal substrate made of only metal for a dye-sensitized solar cell according to claim 10, wherein said arithmetic mean roughness Ra is at least 0.22 µm and said ten point height of irregularities Rzjis is at least 1.20 µm on said substrate surface of said nonporous first metal layer closer to said dye-sensitized solar cell element.

12. The metal substrate made of only metal for a dye-sensitized solar cell according to claim 1, wherein the difference between the thermal expansion coefficient of said third metal layer and the thermal expansion coefficient of said nonporous first metal layer is smaller than the difference between the thermal expansion coefficient of said second metal layer and the thermal expansion coefficient of said nonporous first metal layer.

\* \* \* \* \*